Figure 1:
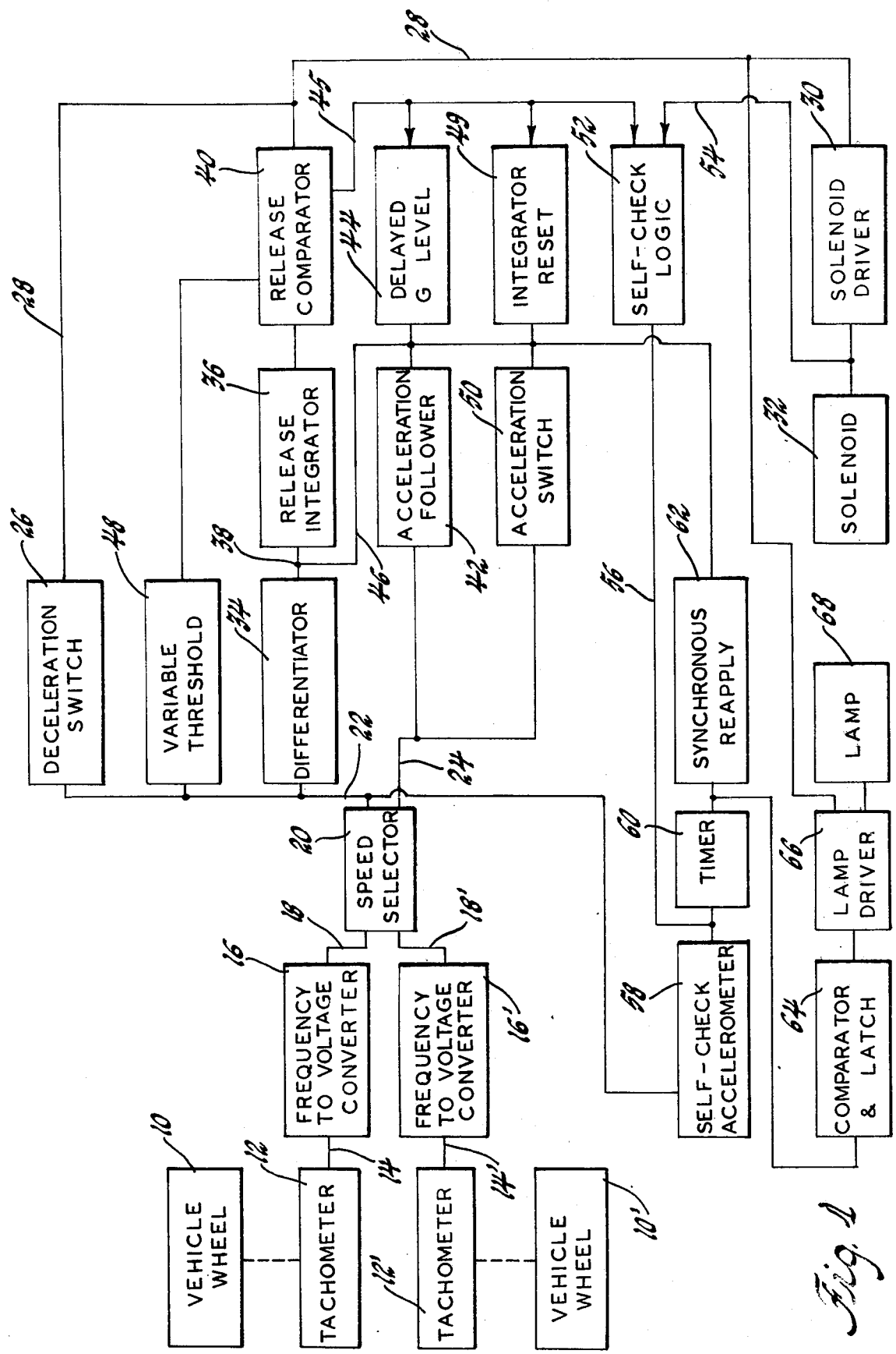

United States Patent
Bremer

[11] 3,953,080
[45] Apr. 27, 1976

[54] ADAPTIVE ANTI-LOCK BRAKE CONTROL SYSTEM

[75] Inventor: Richard J. Bremer, Flint, Mich.

[73] Assignee: General Motors Corporation, Detroit, Mich.

[22] Filed: Mar. 24, 1975

[21] Appl. No.: 561,159

Related U.S. Application Data

[63] Continuation of Ser. No. 419,693, Nov. 28, 1973, abandoned.

[52] U.S. Cl.............................. 303/21 BE; 303/20; 303/21 AF
[51] Int. Cl.² ......................................... B60T 8/02
[58] Field of Search ................ 188/181; 303/20, 21; 307/10 R; 317/5; 324/161–162; 340/53, 62

[56] References Cited
UNITED STATES PATENTS

| | | | |
|---|---|---|---|
| 3,606,491 | 9/1971 | Walsh............................. | 303/21 AF |
| 3,671,083 | 6/1972 | Matsumura..................... | 303/21 BE |
| 3,744,851 | 7/1973 | Burckhardt et al............. | 303/21 BE |
| 3,790,227 | 2/1974 | Dozier ............................ | 303/21 BE |
| 3,832,009 | 8/1974 | Leiber et al..................... | 303/21 P |
| 3,834,770 | 9/1974 | Fleischer et al................. | 303/21 P |

*Primary Examiner*—Trygve M. Blix
*Assistant Examiner*—Stephen G. Kunin
*Attorney, Agent, or Firm*—Warren D. Hill

[57] ABSTRACT

An anti-lock brake control system especially suited to heavy duty trucks with air brakes senses the wheel speeds on a given axle and cyclically releases and applies the brakes on that axle as required to avoid undesirable wheel slip during braking. In one control channel, a deceleration switch responsive to a wheel speed signal produces a brake release signal when wheel deceleration exceeds a predetermined threshold. A second parallel channel, also responsive to wheel speed, derives a velocity error signal representing the difference between wheel speed and an estimated vehicle speed and produces a release signal when the velocity error exceeds a value which varies as a function of wheel speed. The velocity error is determined by comparing the wheel deceleration with a vehicle deceleration and integrating the difference. The estimated vehicle deceleration is determined in large part by a wheel acceleration sensing circuit to determine the rate of wheel spinup during brake release. The second channel also includes an acceleration switch connected to the release integrator to quickly remove the velocity error signal when a predetermined wheel acceleration occurs to effect brake reapplication. A self-check circuit includes a timer producing an output signal which increases with time and a synchronous reapply circuit connected to the second channel to effect brake reapplication when a preset time has expired. The timer is operative when a self-check accelerometer indicates that the wheels are near synchronous speed and when a self-check logic circuit indicates that the control circuit calls for a brake release. A comparator and latch circuit responsive to the timer output signal is actuated when a second larger preset time has expired and is effective to illuminate a warning lamp and to disable the control circuit.

4 Claims, 3 Drawing Figures

ADAPTIVE ANTI-LOCK BRAKE CONTROL SYSTEM

This is a continuation of application Ser. No. 419,693, filed Nov. 28, 1973, now abandoned.

This invention relates to an anti-lock control for vehicle brakes and particularly to such a control which is adaptive to various road conditions.

The U.S. patent application Ser. No. 342,858 filed by Robert H. Wind, now U.S. Pat. No. 3,838,890, sets forth an anti-lock brake control especially suited to heavy duty trucks and particularly includes control circuitry responsive to road conditions and to the loading of the truck. This invention incorporates the primary principles of the earlier invention and adds a number of improvements thereto.

It is an object of this invention to provide an anti-lock brake control which incorporates two independent control channels responsive respectively to wheel deceleration and wheel speed deviation effective independently to release the brakes; wherein the first channel is more sensitive to incipient wheel lock than the second on high coefficient surfaces and at high loads on medium coefficient surfaces and the second channel is more sensitive than the first on low coefficient surfaces and at low loads on medium coefficient surfaces, so that in coaction, the two channels provide high sensitivity throughout a wide range of conditions.

It is a further object of this invention to provide an anti-lock brake control system of the aforesaid type utilizing the degree of wheel acceleration as well as the amount of wheel speed deviation from an estimated vehicle speed in determining the point of brake reapplication during anti-lock brake cycling.

Still another object of the invention is to provide an anti-lock brake control of the aforesaid type with means for effecting brake reapplication in response to the amount of time the wheel maintains an apparent synchronous speed while the brakes are released.

An additional object of the invention is to provide an anti-lock brake control of the aforesaid type wherein one of the channels produces a release signal when a computed velocity error signal exceeds a certain value and includes a circuit responsive to a predetermined wheel acceleration to diminish the velocity error signal to terminate the release signal.

The invention is carried out in its general aspects by providing a control for an anti-lock brake system having apparatus for sensing wheel speed, a first channel sensitive to incipient wheel lock on high coefficient surfaces and at high loads on medium coefficient surfaces for independently producing a brake release signal when a predetermined acceleration threshold is reached and a second channel sensitive to incipient wheel lock on low coefficient surfaces and at low loads on medium coefficient surfaces for independently producing a brake release signal according to the amount of wheel speed deviation from an estimated vehicle speed, and a release device activated by the release signals from each channel to cause brake release when either release signal is initiated and to cause brake reapplication only when both release signals are terminated. The invention further contemplates an acceleration sensing circuit for terminating the release signal from the second channel when a predetermined positive wheel acceleration occurs, as well as a synchronous reapply circuit for effecting termination of the brake release signal of the second channel whenever the value of wheel acceleration indicates that the speed is near synchronous speed for a determinable time period. In addition, the first channel includes a circuit for terminating its brake release signal in response to the departure of wheel speed from a reference value.

Figure 2A:
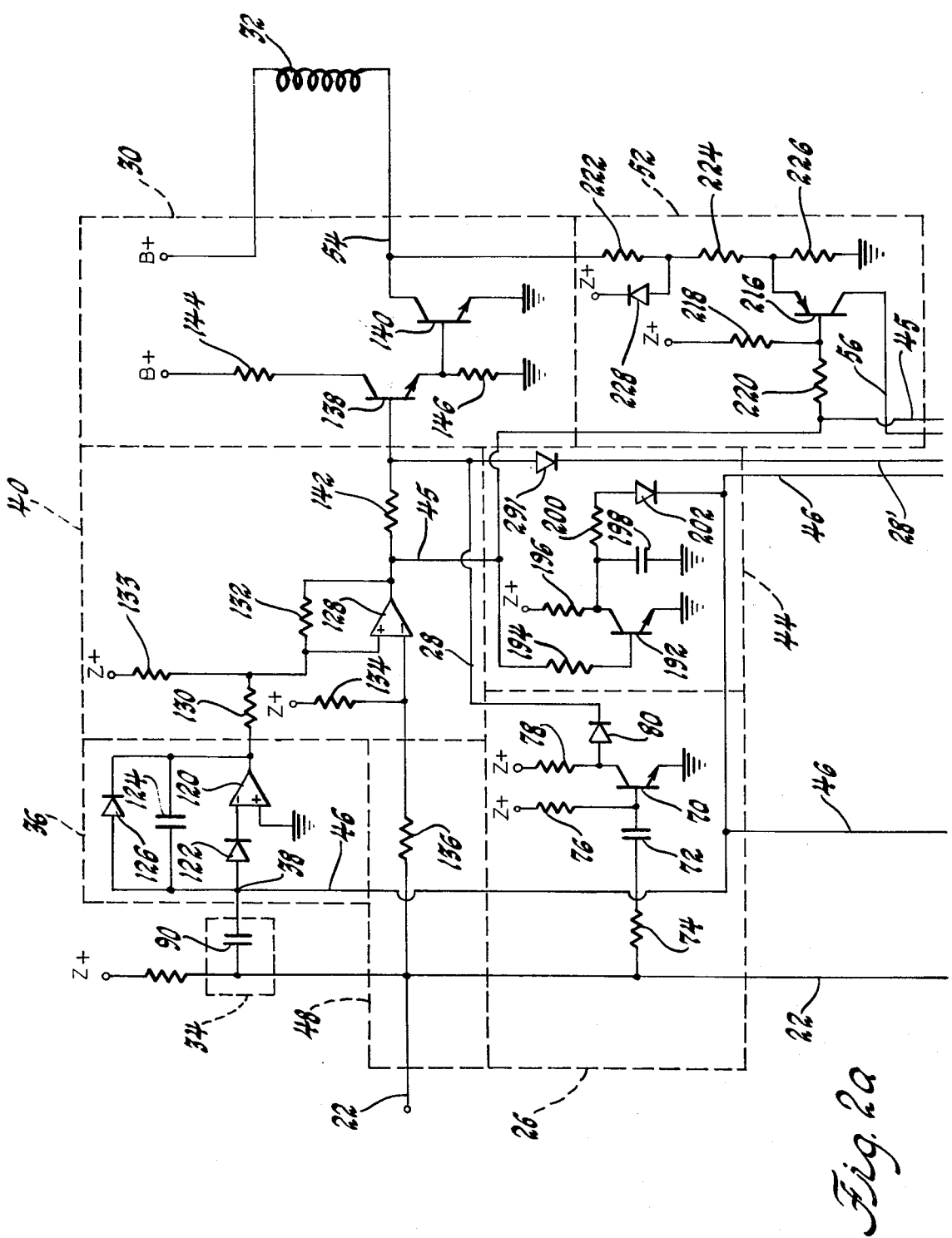
Figure 2B:
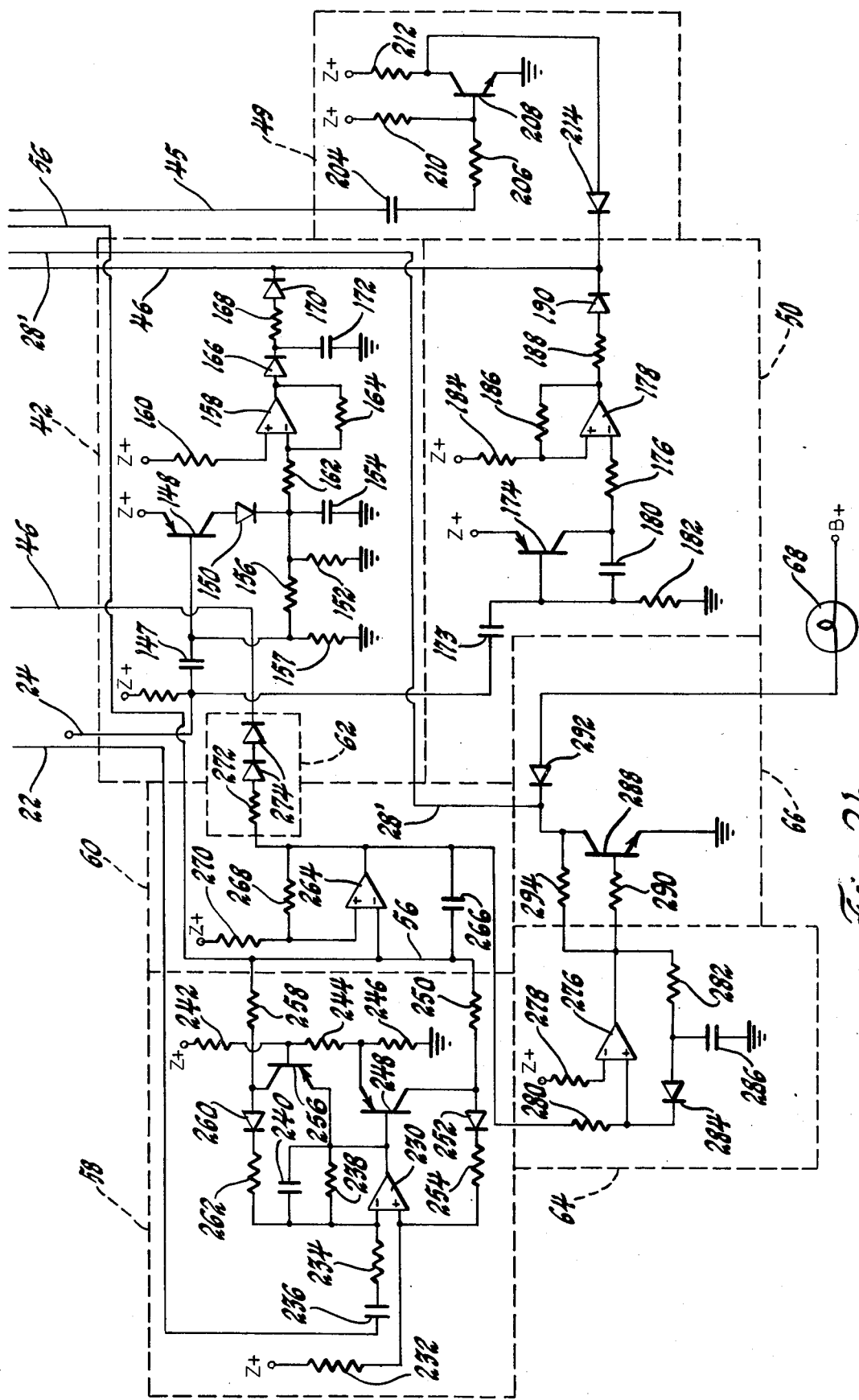

The above and other advantages will be made more apparent from the following specification taken in conjunction with the accompanying drawings wherein like reference numerals refer to like parts and wherein:

FIG. 1 is a block diagram of an anit-lock brake control according to the invention, and FIGS. 2a and 2b comprise a schematic electrical diagram of a portion of the anit-lock brake control of FIG. 1.

While this invention is considered to be of general application to wheeled vehicles, it is disclosed herein as applied to heavy trucks with air brakes. In such vehicles it is contemplated that each axle will be controlled independently of the others both on the tractor and on the trailer such that each axle will be furnished with a complete anti-lock brake control system, the brake systems on the several axles having in common only the manually controlled air pressure which is supplied at the will of the vehicle operator.

A system for which this invention is utilized follows the well established principle of sensing incipient wheel lockup when brake pressure is applied to vehicle brakes, then releasing the brake pressure until the wheel accelerates to a speed near that which is normal for a braked wheel and then reapplying the pressure. This cycle is repeated as necessary to achieve the desired braking action.

One channel of the system employs an improved version of the inertia wheel velocity reference principle which is fully set forth in the U.S. Pat. No. 3,554,612 to Harned. That principle involves measuring the velocity of the braked wheel and subtracting therefrom a simulated vehicle velocity and utilizing the difference as a criterion of when the wheel brakes should be released and reapplied for most effective control. In practice, this principle has been applied by comparing the wheel deceleration with a vehicle deceleration estimate and integrating the difference to obtain a signal representing velocity error or the amount by which the vehicle speed estimate exceeds the wheel speed. This velocity error is then compared to a threshold value by a comparator circuit which issues a brake release signal when the velocity error exceeds the threshold and a reapply signal when the velocity error drops below the threshold. According to the present invention, the estimated vehicle deceleration is determined in a manner which makes allowance for the coefficient of friction of a surface on which the wheel is traveling as well as the loading on the wheel. The comparator threshold is varied according to wheel speed to adjust system sensitivity. Circuits are provided to override the release signal from that channel under certain conditions to be described to improve braking performance.

The term "acceleration" as used herein refers to both positive acceleration and deceleration unless otherwise specified. As shown in FIG. 1, vehicle wheels 10 and 10' are connected with tachometers 12 and 12' respectively for sensing the wheel speeds. The tachometers are preferably toothed wheel variable reluctance, electromagnetic transducers providing a signal having a frequency proportional to wheel speed on lines 14 and 14' which are connected to frequency to voltage converters 16 and 16'. The converters 16 and 16' provide on lines 18 and 18' electrical analogue signals proportional to wheel speed. The analogue signals are fed to a speed selector 20 which transmits to lines 22 and 24 the analogue signal representing the lowest wheel speed. Alternatively for some applications, an average or the highest wheel speed can advantageously be used to provide the speed signal. The speed signals on the lines 22 and 24 are identical, the purpose of two lines being to ease the load on the output sections of the speed selector 20.

A first control channel comprises a deceleration switch circuit 26 having the speed signal on line 22 as its input and providing a brake release control signal on line 28 whenever the rate of decrease of the speed signal indicates that the selected wheel decelerates at a predetermined value which is greater than the maximum linear deceleration which can be achieved by the vehicle. A value of 1 or 2 g's is preferably used as the deceleration threshold and is indicative of incipient wheel lock. The brake release control signal from the deceleration switch 26 is maintained until some time after the wheel begins to accelerate.

A solenoid driver 30 responsive to the release control signal on line 28 amplifies that signal to energize a solenoid 32 which is effective to cause brake release and maintain brake release only so long as the release control signal is sustained on line 28.

A second control channel includes as its primary components a differentiator 34 having its output connected to a release integrator 36 through a summing junction 38 and a release comparator 40 responsive to the output of the release integrator and providing at its output on line 28 a release control signal. An acceleration follower circuit 42 connected to the line 24 and a delayed g level circuit 44 connected to an output of the release comparator 40 and line 45 each have outputs carried by line 46 to the summing junction 38. The outputs together comprise a vehicle deceleration reference signal. The differentiator circuit 34 is responsive to the wheel speed signal to provide an output representing wheel acceleration. The wheel acceleration signal from the differentiator 34 is summed at point 38 with the vehicle deceleration reference signal, the algerbraic sum of which provides the input of the release integrator 36. During wheel deceleration, that input is the difference between wheel deceleration and the estimated vehicle deceleration and the time integrated value displayed at the output of the release integrator is the difference between wheel speed and estimated vehicle speed, referred to herein as velocity error or deviation from synchronous speed. The release comparator 40 then compares the velocity error signal with a threshold value indicative of incipient wheel lock and produces a brake release control signal on line 28 when the velocity error exceeds the threshold signal. The release comparator has a built-in threshold corresponding to 5 mph which is changed to 3 mph upon brake release to provide hysteresis for the rejection of ripple. A variable threshold circuit 48 provides a further threshold contribution increasing linearly with wheel speed at the rate of 1 mph for each 10 mph increase in the selected wheel speed.

The acceleration follower circuit 42 differentiates the speed signal on line 24 and provides an output on the line 46 which is a function of the positive wheel acceleration occurring during each brake release cycle of anti-lock braking. The output of the acceleration follower increases substantially linearly during increasing acceleration from zero at 1 g acceleration to a value representing 0.75 g's at 2 g's acceleration. The follower further senses the peak positive acceleration and produces a corresponding output which decays at a slow rate having a time constant of 0.55 seconds so that the signal level on line 46 is strongly influenced in each cycle (other than the first signal) by the positive wheel acceleration in the previous cycle.

The delayed g level circuit 44 has as its input the release comparator signal on line 45 and adds to the reference signal on line 46 a contribution representing 0.8 g's a delayed time after brake application. The time of delay is very short and the contribution is gradually applied with a time constant of 0.6 seconds after an apply signal is present on line 45. Thus normally prior to anti-lock brake operation, the full 0.8 g's is contributed to line 46. The delayed g level signal, however, is terminated whenever a brake release signal is applied to line 45. Thus after the initial release in anti-lock braking operation, the contribution of the delayed g level circuit is gradually applied with a time constant of 0.6 seconds after each apply signal appears on line 45.

An integrator reset 49 has its input connected to line 45 and its output connected to line 46. Each time the release comparator 40 terminates the release control signal to effect brake reapplication, the corresponding signal on line 45 triggers the integrator reset circuit to produce a 10 millisecond pulse which is fed to the summing junction 38 to bias the release integrator 36 into its normal condition signalling zero velocity error. This insures that any erroneous vehicle deceleration estimates from previous cycles are not accumulated.

The operation of the basic portion of the second channel is to produce a release control signal on line 28 when the wheel deceleration is greater than the estimated vehicle deceleration signal and sufficient time has elapsed for the release integrator to accumulate a velocity error greater than the variable threshold in the release comparator. The release signal normally is sustained until sufficient wheel speed recovery takes place to lower the velocity error to the value of the variable threshold of the release comparator; then termination of the release control signal causes brake reapplication. When the wheel deceleration is lower than the switch point of the deceleration switch 26 and is greater than the estimated vehicle deceleration on line 46, then the control signal from the second channel will occur prior to that from the first channel to cause brake release so that the first channel is ineffective. However, in the event of a high wheel deceleration, the deceleration switch 26 will provide a release control signal on line 28 before any such signal is produced by the second channel. If the second channel shall have produced a similar release signal before the deceleration switch 26 switches off, the second channel maintains the brake release and controls the time of brake reapplication. In certain instances, it is desirable to modify the time of brake reapplication, for example, by the acceleration switch 50.

The acceleration switch 50 has its input connected to line 24 carrying the selected wheel speed signal and has its output connected to line 46. When positive wheel acceleration exceeds 3 g's, the acceleration switch 50 produces an output signal sufficiently large to quickly bias the release integrator 36 to its normal (zero velocity error) state causing brake reapplication. The result is that a reapply signal will occur earlier when the vehicle is on a high coefficient surface to anticipate wheel speed recovery thereby compensating for delays in the brake apply mechanism to provide more efficient braking.

The remainder of the circuit of FIG. 1 provides a self-check service to monitor malfunctions in the control and in addition provides a control function by furnishing an additional means to modify the brake reapplication time. A self-check logic circuit 52 has inputs connected to the line 45 from the release comparator and from line 54 connected to the output of the solenoid driver. During brake application, the signal on line 45 is low while the signal on line 54 is high. As long as that condition occurs, the self-check logic circuit 52 produces a continuous reset output signal on line 56. That reset signal is terminated when either of the signals on line 45 and 54 change state indicating that a release signal has been given or requested. A self-check accelerometer 58 is connected to line 22 to receive the speed signal therefrom. The accelerator 58 differentiates the speed signal and monitors the wheel acceleration and produces an output signal whenever the positive wheel acceleration is greater than 0.5 g's and wheel decelerations greater than 1.5 g's occur. The output signal comprises a reset signal on line 56. The absence of an output signal from the self-check accelerometer 58 indicates that the selected wheel deceleration or acceleration is small and that measurement is interpreted as meaning that the selected wheel is at or near synchronous speed provided the condition persists. A persistent synchronous wheel speed occurring during brake release indicates that the control circuit is not operating correctly, perhaps due to a poor vehicle deceleration estimate in the second channel or to an external system problem.

A timer 60 has line 56 as its input. When a reset signal is present on line 56, the timer 60 is inoperative and its output is at a nominal zero value. When, however, the brakes are released and the selected wheel is near synchronous speed, there will be no reset signal on line 56 and the timer 60 will produce an output voltage increasing with time. A synchronous reapply circuit 62 connected to the timer output is triggered by the timer output voltage after 0.3 seconds of timer operation. The synchronous reapply output is a large signal applied to the line 46 sufficient to quickly drive the release integrator to a condition forcing a brake reapplication. Thus if a synchronous wheel speed persists for 0.3 seconds during brake release, the timer 60 and synchronous reapply circuit 62 effect the brake reapplication and if the persistence of synchronous speed was due to an erroneous vehicle deceleration estimate, the controller will correct itself on the new cycle and continue to operate. If, however, the condition is caused by an external problem such as a solenoid failure, the circuit described below will disable the controller.

A comparator and latch circuit 64 senses the timer output voltage and will produce an output when the timer has been energized for 0.5 seconds and the output will be latched on even if the timer output is subsequently removed. A lamp driver 66 is actuated by the output of the comparator and latch circuit 64 and provides two output signals, one of which is effective to ground line 28 to disable the solenoid driver 30 thereby disabling the controller. The second output will illuminate a lamp 68 to alert a vehicle operator that the controller has been disabled and the braking for that axle will continue under manual control.

A specific example of the control circuit is set forth in FIGS. 2a and 2b. A power supply not shown comprises a vehicle battery having a voltage B+ of nominally 12 volts and a regulated power output Z+ of 8.2 volts. Since means for developing speed signals are well known in the art, they are not shown in detail.

The deceleration switch 26 includes a transistor 70 having its base connected by a differentiating capacitor 72 and a resistor 74 to the line 22 carrying the speed signal. The base is further connected to a bias resistor 76 to Z+. The emitter is grounded while the collector is connected through a resistor 78 to Z+ and is connected through a diode 80 to line 28. In the absence of wheel deceleration, the resistor 76 provides more than sufficient current to the base of the transistor 70 to hold the transistor on so that the collector voltage is low and no output signal is provided to line 28. During wheel deceleration greater than a preset value, the differentiating capacitor 72 draws sufficient current from the resistor 76 to cause the transistor 70 to cut off thereby allowing the collector voltage to go high to apply a release control voltage to line 28. The size of the resistor 76 is selected to control the deceleration threshold, i.e. 1 or 2 g's at which the control signal is produced.

Due to delays in the brake system, the brake pressure will continue to increase after the control signal is produced causing wheel deceleration greater than the deceleration threshold. The decreasing speed signal on line 22 pulls down the voltage on the base of transistor 70 while the current through the resistor 76 flowing to the capacitor 72 tends to restore the base voltage at approximately the deceleration threshold rate. For short time durations and small wheel speed departure, the base voltage then represents the departure of the selected wheel speed from a reference speed decelerating at approximately the deceleration threshold rate. As the wheel begins to accelerate and the base voltage rises in response to the wheel speed departure approaching zero, the transistor 70 turns on removing the control signal.

The differentiator 34 comprises a capacitor 90 connected between the line 22 and the summing point 38. The release integrator 36 has as its input the current signals from the differentiator 34 and the line 46 which is summed at the junction point 38. The release integrator includes an operational amplifier 120. This operational amplifier as well as the others in the control is the Norton type (e.g. Motorola MC 3301P) which has substantially constant input voltages at about one-half volt and which operates on the basis of the differential current at the inputs. The positive input of amplifier 120 is connected to ground and the negative input is connected through a diode 122 to the junction 38. A feedback capacitor 124 and a diode 126 are connected between the junction point 38 and the amplifier output. The capacitor 124, of course, provides the integrating function of the circuit while the diode 126 insures that the amplifier output does not go below one-half volt. The junction point 38 is clamped at a maximum of about 1 volt above ground due to the voltage drop across the diode 122 and the substantially constant input voltage of the operational amplifier. During wheel deceleration the capacitor 90 draws current from the junction 38 and when it exceeds that supplied by line 46, the current deficiency is made up by current flow through capacitor 124 causing the amplifier output voltage to increase. When the wheel deceleration is great enough to cause the amplifier to saturate, the junction point 38 will decrease in voltage according to the degree of discharge of the capacitor 90. By virtue of the diode 122, this decrease serves as a memory function so that a corresponding wheel acceleration must occur to restore the junction point to its nominal clamped voltage and the amplifier will then operate again in its linear range.

The integrator output voltage representing velocity error is fed to the release comparator 40 which comprises an operational amplifier 128 having its positive input connected through a resistor 130 to the integrator and having a feedback resistor 132 between its output and its positive input. The positive input is also connected through a resistor 133 to Z+. The negative input of the amplifier 128 is connected through a bias resistor 134 to Z+, the resistor 134 being selected to provide a threshold value of 5 mph representing the minium threshold. The negative input of the amplifier 128 is also connected to the variable threshold circuit 48 which comprises a resistor 136 connected to the line 22 carrying the wheel speed information. Thus current through the resistor 136 is added to the current through the resistor 134 to provide a variable threshold according to wheel speed such that the threshold increases by an amount representing 1 mph for every 10 mph increase of wheel speed. The feedback resistor 132 provides hysteresis such that when the release comparator produces a positive output representing a release request signal, the effective threshold is reduced by 2 mph thereby assuring positive switching action when the comparator changes state. The output of the amplifier 128 is connected through a resistor 142 to line 28.

The solenoid driver 30 is a two-stage amplifier comprising transistors 138 and 140. Transistor 138 has its base connected to line 28 and its collector connected to B+ through a resistor 144. The emitter of the transistor 138 is connected to ground through a resistor 146 and is also connected to the base of the transistor 140. The transistor 140 has a grounded emitter and its collector is connected to the solenoid 32. The solenoid is further connected to B+ so that when a positive release signal is applied to line 28, the transistors 138 and 140 conduct allowing energizing current to flow through the solenoid 32. Similarly when the positive release signal is removed from the line 28, the transistors are rendered nonconductive and the energizing current is switched off.

The acceleration follower circuit 42 is connected to line 24 carrying a wheel speed signal and comprises a differentiating capacitor 147, a two-stage amplifier and a peak follower circuit. The first-stage amplifier is an inverter comprising a transistor 148 having its base connected to capacitor 147 and its emitter connected to Z+. The collector of that transistor is connected through a diode 150 to a filter comprising a resistor 152 and a capacitor 154 connected in parallel to ground. A feedback resistor 156 is connected between the transistor base and the cathode of the diode 150. A resistor 157 is connected between the base and ground. The second amplifier stage is also an inverter comprising an operational amplifier 158 having its positive input connected through a resistor 160 to Z+ and its negative input connected through an input resistor 162 to the cathode of the diode 150. A feedback resistor 164 is connected between the negative input and the output of the operational amplifier 158. The peak follower circuit includes a diode 166, a resistor 168 and a diode 170 connected in series between the output of the amplifier 158 and the line 46. The cathode of the diode 166 is connected through a capacitor 172 to ground. In operation the positive wheel acceleration signal from the capacitor 147 is filtered and substantially proportionately amplified to charge the capacitor 172 according to the valve of the acceleration but reduced by the amount of the voltage drop across the diode 166. When the voltage across the capacitor 172 exceeds the forward voltage drop of the diode 170 and the voltage of the junction point 38 which will occur at an acceleration of 1 g, the diode 170 will conduct to contribute current to the deceleration reference signal on line 46, the amount of the contribution of course being proportionate to the capacitor voltage. The current supplied to the line 46 will increase as the wheel acceleration increases. When wheel acceleration reaches a peak and then diminishes, the capacitor 172 will discharge at a rate determined by the capacitor 172 and the resistor 168. Preferably those components are selected to provide a time constant of 0.55 seconds. Accordingly, the acceleration follower output decreases gradually after the positive acceleration peak.

The acceleration switch 50 includes differentiating capacitor 173 connected to line 24 and a transitor 174 having its emitter connected to Z+ and its base connected to the capacitor 173. The collector is connected through a resistor 176 to the negative input of an operational amplifier 178. A capacitor 180 is connected across the base and collector of transistor 174 and with the resistor 176 acts as a filter of AC ripple. A resistor 182 connected between the base of the transistor and ground acting with the capacitor 173 establishes the acceleration required for switching the transistor 174. The operational amplifier 178 has its positive input connected through a resistor 184 to Z+ and through a feedback resistor 186 to the amplifier output. The feedback resistor provides hysteresis for ripple rejection which is effective particularly at low speeds. The output of the amplifier 178 is connected through a resistor 188 and a diode 190 to line 46. Normally the transistor 174 is conducting to drive the output of amplifier 178 to 0 volts. When the positive wheel acceleration attains a predetermined value, preferably 3 g's, the transistor 174 cuts off allowing the amplifier 178 to switch to a positive output thereby supplying a signal to line 46 sufficient to rapidly drive the release integrator output voltage down to a value requiring brake reapplication.

The delayed g level circuit 44 comprises a transistor 192 having its base connected through a resistor 194 to the line 45, a grounded emitter and a collector connected through a resistor 196 to Z+. The transistor collector is further connected through a capacitor 198 to ground and through a resistor 200 and a diode 202 to line 46. In the brake apply mode, the voltage on line 45 is low so that the transistor 192 is cut off and the capacitor 198 is fully charged. Then current representing 0.8 g's of deceleration is applied to the line 46 through the diode 202. When, however, a positive release signal is presented to line 45, the transistor 192 conducts to discharge the capacitor 198 almost immediately so that the diode 202 becomes backbiased and no current flows therethrough. When the brake reapplication is requested, the voltage on line 45 becomes low, the transistor 192 will cut off causing the capacitor 198 to slowly charge through the resistor 196 with a time constant of 0.6 seconds. Due to the forward voltage drop of the diode 202 and the nominal 1 volt potential of the junction point 38, current does not immediately flow through the diode 202. However, after a time delay required for the capacitor 198 to receive a sufficient charge, current will flow through the diode 202 to line 46 is a gradually increasing exponential manner.

The integrator reset circuit 49 comprises a capacitor 204 connected to the line 45 and connected through a resistor 206 to the base of a transistor 208. The transistor base is also connected through a bias resistor 210 to Z+. The collector is connected to Z+ through a resistor 212 and is further connected through a diode 214 to line 46. During brake release the signal on line 45 is high having no effect on the transistor 208, the transistor being biased into conduction by a current through the resistor 210. When the release comparator turns off to effect brake reapplication, the potential of line 45 quickly drops causing a discharge of the capacitor 204 which turns off the transistor 208 for 10 milliseconds thereby causing a current pulse through the diode 214 to the line 46 which insures that the release integrator 36 is reset to a normal condition indicative of no velocity error.

The self-check logic circuit 52 comprises a transistor 216 having its base connected through a resistor 218 to Z+ and connected through resistor 220 to line 45, the two resistors establishing the base potential. The emitter of the transistor 216 is connected to a voltage divider comprising resistors 222, 224 and 226 serially connected between ground and line 54 at the solenoid driver output. The transistor emitter is connected to the junction of the resistors 224 and 226 while the junction of the resistors 224 and 226 is connected through a diode 228 to Z+ which insures a constant reference voltage at the last mentioned junction when high voltage is applied to line 54. The collector of the transistor 216 is connected to line 56. During periods of brake application, the potential on line 45 is low and the potential on line 54 is high causing the transistor 216 to conduct to apply a high signal on line 56. During brake release, the potential of line 45 is high and that of line 54 is low so that the transistor 216 is cut off and the output is low.

The self-check accelerometer 58 includes an operational amplifier 230 having its positive input connected through resistor 232 to Z+ and its negative input connected through a resistor 234 and a differentiating 236 to line 22. A feedback resistor 238 between the operational amplifier output and the negative input establishes the amplifier gain while a capacitor 240 parallel therewith provides filtering. A voltage divider comprising resistors 242, 244 and 246 serially connected between Z+ and ground provides reference potentials at the resistor junctions. A transistor 248 has its base connected to the output of the amplifier output 230, its emitter connected to one of the resistor junctions and its collector connected through a resistor 250 to line 56. The collector is further connected through a feedback circuit comprising a diode 252 and a resistor 254 connected to the positive input for the operational amplifier. A second transistor 256 has its emitter connected to the amplifier output, its base connected to the other resistor junction and its collector connected through resistor 258 to the line 56. The collector is also connected through a feedback circuit comprising a diode 260 and resistor 262 to the negative input of the amplifier. In operation, the resistor 232 passes sufficient bias current to the amplifier to provide nominal output signal of 3 volts. The wheel speed signal on line 22 is differentiated by the capacitor 236 such that in the event of positive wheel acceleration, the amplifier output voltage is caused to decrease and during wheel deceleration the amplifier output will increase. The transistors 248 and 256 are biased off due to the reference potential supplied by the voltage divider when the amplifier output is at the nominal 3 volt level. Transistor 248 will turn on, however, to provide an output to line 56 when the amplifier voltage drops to 2 volts representing a wheel acceleration of 0.5 g's and the transistor 256 will similarly turn on to provide an output when the amplifier output reaches 7 volts corresponding to a wheel deceleration of 1.5 g's. The two feedback circuits from the transistor collectors to the amplifier inputs limit the amplifier gain to prevent the input from being pulled out of the linear operating range of the amplifier. The self-check accelerometer 58 then provides an output to line 56 whenever wheel acceleration or deceleration occurs beyond the described limits and there is no output for small acceleration or deceleration.

The self-check timer 60 comprises an integrator having an operational amplifier 264 with an integrating feedback capacitor 266 between the output and a negative input thereof and a positive feedback resistor 268 between the output and the positive input thereof. The positive input is connected through a resistor 270 to Z+ while the negative input is connected to line 56 carrying the output signals from self-check accelerometer 58 and the self-check logic circuit 52. When there is a current in line 56 indicating either a brake apply condition or a non-synchronous wheel speed, the operational amplifier is biased to a low output state. When, however, the current in line 56 is removed, the amplifier output gradually increases due to bias current on the positive input such that the magnitude of the voltage output is related to the time period of operation of the timer since the removal of a high signal from line 56. Specifically an output of 3 volts represents 0.3 seconds of operation and an output of 5 volts represents 0.5 seconds of timer operation.

The synchronous reapply circuit 62 comprises a current limiting resistor 272 and two diodes 274 serially connected between the output of the timer 60 and line 46. The diodes prevent conduction of the synchronous reapply circuit until the timer output reaches 3 volts at which time a large current is fed to line 46 and the junction point 38 to quickly drive the release integrator to a low state requiring brake reapplication. Thus the brakes are reapplied providing that during a period of 0.3 seconds the brakes have been released and the wheels remain near a synchronous speed. If at any time during the 0.3 second period the brakes become reapplied or the wheel acceleration or deceleration exceeds the limits of the self-check accelerometer, the timer will be reset and the synchronous reapply circuit will not produce an output. The benefit of the synchronous reapply circuit is to assure that an extended brake release does not occur with the selected wheel at synchronous speed which may otherwise happen if an erroneous vehicle deceleration estimate is applied to line 46.

The comparator and latch circuit 64 comprises an operational amplifier 276 having its negative input connected to a resistor 278 to Z+ and its positive input connected through a resistor 280 to the output of the timer 60. A feedback circuit comprising a resistor 282 and a diode 284 extends from the amplifier output to the positive input. A capacitor 286 is connected from the junction of the feedback resistor and diode to ground. Normally the bias current to the negative input of the amplifier 276 maintains the amplifier output voltage low. If the timer output exceeds 5 volts, the positive input of the amplifier is biased to cause switching of the amplifier output to a high state. The feedback circuit performs a latching function to maintain the high output even if the timer output voltage is subsequently removed. The diode and capacitor in the feedback circuit provides transient surpression.

The lamp driver 66 comprises a transistor 288 having a grounded emitter and its base connected through a resistor 290 to the output of the comparator and latch circuit 64. The collector of the transistor is connected through line 28' and diode 291 to line 28 at the input of the solenoid driver, and further is connected through a diode 292 to the lamp 68 which in turn is connected to a source of B+ independent of the B+ source which supplies power to the remainder of the controller. A resistor 294 is connected from the collector of the transistor 288 to the output of the comparator and latch circuit. Since the output of the comparator and latch circuit 64 is normally low, the transistor 288 is turned off. If, however, the comparator and latch circuit is energized to provide a high output, the transistor 288 is turned on to effectively ground the line 28 thereby disabling the solenoid driver and the controller. In addition when the transistor 288 is conducting, lamp current can flow through the transistor 288 to illuminate the lamp 68 so that the lamp provides a warning to the vehicle operator that the controller is disabled. Even when the control is disabled by reason of no B+ or Z+ voltage to the controller, the lamp 68 will be illuminated since lamp current will flow through the diode 292, resistor 294 and resistor 290 to turn on the transistor 288. Thus when the brakes are released and the wheels are within specified acceleration and deceleration limits for a period of 0.5 seconds and the operation of the synchronous reapply circuit 62 has failed to correct the condition at the time of 0.3 seconds, than the comparator and lamp circuit will be activated to cause the lamp driver 66 to disable the control.

In summary, the controller action during an anti-lock brake stop can be divided into three modes. The first is the release mode which causes a reduction of the braking torque on the wheels of the controlled axle. The release signal is generated by the first channel comprising the deceleration switch when the wheel deceleration level exceeds a preset threshold or by the second channel including the release comparator 40 when the velocity error signal from the release integrator 36 exceeds the release comparator 40 speed threshold.

Once the release has occurred and the wheels begin to accelerate, the reapply mode is entered. The deceleration switch 26 calls for brake reapplication when the wheel speed recovers sufficiently to nullify the wheel speed departure detected by the deceleration switch. If the second channel has also called for a release, the positive wheel acceleration level is used to determine when the reapply should occur. When the wheel acceleration is below the acceleration switch 50 threshold of 3 g's, the reapplication occurs when the velocity error becomes less than the release comparator speed threshold. If the 3 g threshold of the acceleration switch is exceeded, it is desirable that the system immediately initiate the reapplication mode because of inherent solenoid and relay valve delays. The acceleration switch overrides the vehicle deceleration estimating function forcing the release integrator to a bias state which causes the release comparator to terminate the release control signal on line 28.

Since the torque applied to the wheel by the road is a product of the road coefficient and the load on the wheel, and the wheel is more responsive when that product is high, the first channel controls the anti-lock brake operation on high coefficient surfaces or at high load on medium coefficient surfaces. The brake operation is smoother and vehicle stability is better under those conditions with the first channel controlling both release and apply than if the second channel only were available to control the brakes. When the load-coefficient product is low and wheel accelerations are less abrupt, then the second channel controls the braking since it is more sensitive than the first channel under those conditions. Thus on low coefficient surfaces or at low loads on medium coefficient surfaces, the second channel controls the anti-lock braking.

The third mode of operation, synchronous reapply, is entered when the self-check circuitry determines that the selected wheel is decelerating at less than 1.5 g's and accelerating at less than 0.5 g's and the controller has generated a release signal for more than 0.3 seconds. The synchronous reapply circuit 62 forces the release integrator and release comparator circuitry to quickly terminate the release control signal. If the synchronous apply condition exists because of a poor vehicle deceleration estimate, the controller will correct itself and continue to operate. When the condition is caused by an external system problem such as a solenoid failure and the condition exists for 0.5 seconds, the controller will be disabled and the lamp 68 is illuminated.

The embodiment of the invention described herein is for purposes of illustration and the scope of the invention is intended to be limited only by the following claims.

The embodiments of the invention in whcih an exclusive property or privilege is claimed are defined as follows:

1. A control apparatus for an anti-lock brake system for a vehicle with braked wheels comprising
   means providing a speed signal which represents wheel speed,
   a control circuit for producing an on/off control signal,
   release means activated by the control signal to effect brake release when the control signal is initiated and brake reapplication when the control signal is terminated,
   the control circuit including first and second channels each for independently sensing incipient wheel lock and producing the control signal,
   the first channel comprising a deceleration sensing means responsive to the speed signal for producing the control signal when the rate of change of wheel speed exceeds a predetermined deceleration threshold indicative of incipient wheel lock,
   the second channel comprising means responsive to the speed signal for deriving a velocity error signal representing the difference between wheel speed and an estimated vehicle speed and means for producing the control signal when the velocity error signal exceeds one threshold indicative of incipient wheel lock and terminating the control signal when the velocity error signal drops below another threshold, and means effective during brake release for requesting brake reapplication when the wheel rotates near synchronous speed for a predetermined time period comprising timer means connected to the second channel producing an output signal after a predetermined period, the output signal being effective to terminate the control signal and to request brake reapplication, and timer reset means for resetting the timer including accelerometer means responsive to the speed signal for supplying a reset signal to the timer means when the wheel acceleration exceeds preset limits and means responsive to the release means for supplying a reset signal to the timer means when the brakes are applied.

2. A control apparatus for an anti-lock brake system for a vehicle with braked wheels comprising means providing a speed signal which represents wheel speed, a control circuit for producing an on/off control signal, release means activated by the control signal to effect brake release when the control signal is initiated and brake reapplication when the control signal is terminated, the control circuit including first and second channels each for independently sensing incipient wheel lock and producing the control signal, the first channel comprising a deceleration sensing means responsive to the speed signal for producing the control signal when the rate of change of wheel speed exceeds a predetermined deceleration threshold indicative of incipient wheel lock, the second channel comprising means responsive to the speed signal for deriving a velocity error signal representing the difference between wheel speed and an estimated vehicle speed and means for producing the control signal when the velocity error signal exceeds one threshold indicative of incipient wheel lock and terminating the control signal when the velocity error signal drops below another threshold, and means effective during brake release for requesting brake reapplication when the wheel rotates near synchronous speed for a predetermined time period, and further means effective during brake release for disabling the control circuit to return the brake system to manual control when the wheel rotates near synchronous speed for a preset time period greater than the said predetermined time period.

3. A control apparatus for an anti-lock brake system for a vehicle with braked wheels comprising means providing a speed signal which represents wheel speed, a control circuit for producing an on/off control signal, release means activated by the control signal to effect brake release when the control signal is initiated and brake reapplication when the control signal is terminated, the control circuit including first and second channels each for independently sensing incipient wheel lock and producing the control signal, the first channel comprising a deceleration sensing means responsive to the speed signal for producing the control signal when the rate of change of wheel speed exceeds a predetermined deceleration threshold indicative of incipient wheel lock, and further responsive to the speed signal during the production of the control signal for detecting the departure of wheel speed from a reference vehicle speed decreasing at the rate of the deceleration threshold and for terminating the control signal from the first channel when the departure is reduced to substantially zero, the second channel comprising means responsive to the speed signal for deriving a velocity error signal representing the difference between wheel speed and an estimated vehicle speed and means for producing the control signal when the velocity error signal exceeds one threshold indicative of incipient wheel lock and terminating the control signal when the velocity error signal drops below another threshold.

4. A control apparatus for an anti-lock brake system for a vehicle with braked wheels comprising means providing a speed signal which represents wheel speed, a control circuit including first and second channels each for independently sensing incipient wheel lock and producing first and second release signals respectively, the first channel being more sensitive to incipient wheel lock than the second channel on high coefficient surfaces and at high loads on medium coefficient surfaces, and the second channel being more sensitive on low coefficient surfaces and at low loads on medium coefficient surfaces, such that the two channels together provide high sensitivity throughout a wide range of conditions, the first channel comprising a deceleration sensing means responsive to the speed signal for producing the first release signal when the rate of change of wheel speed exceeds a predetermined deceleration threshold indicative of incipient wheel lock and for sensing wheel speed recovery to terminate the first release signal, the second channel comprising means responsive to the speed signal for developing an estimated vehicle deceleration signal and a wheel deceleration signal, means for integrating the difference between the estimated vehicle deceleration signal and the wheel deceleration signal to produce a velocity error signal representing the difference between wheel speed and an estimated vehicle speed, and means for producing the second release signal when the velocity error signal exceeds a reference value in the comparator indicative of incipient wheel lock, and terminating the second release signal when the velocity error signal drops below a reference value, the second channel further including wheel acceleration, sensing means responsive to the speed signal for artifically increasing the estimated vehicle deceleration signal at a predetermined value of positive wheel acceleration and rapidly driving the velocity error signal down to a low value for terminating the second release signal, and release means activated by each of the first and second release signals for effecting brake release when either release signal is initiated irrespective of the other release signal, and deactivated for effecting brake reapplication only when both release signals are terminated.

* * * * *